UNITED STATES PATENT OFFICE.

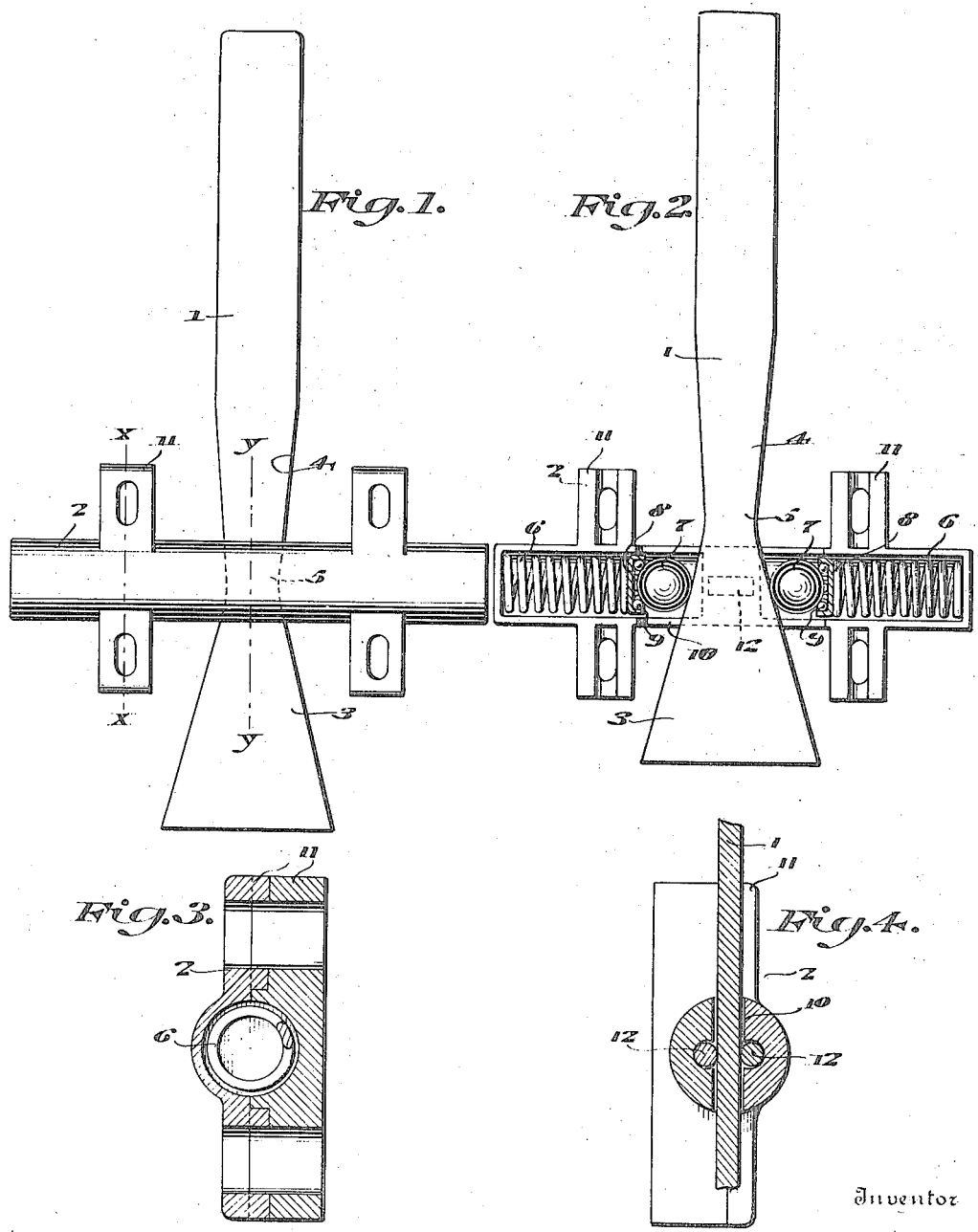

HARRY F. HARVEY, OF AUSTIN, TEXAS.

SHOCK-ABSORBER.

1,158,210.   Specification of Letters Patent.   Patented Oct. 26, 1915.

Application filed July 28, 1914. Serial No. 853,651.

*To all whom it may concern:*

Be it known that I, HARRY F. HARVEY, a citizen of the United States, residing at Austin, in the county of Travis and State of Texas, have invented new and useful Improvements in Shock-Absorbers, of which the following is a specification.

The invention has relation to the class of devices to be applied to vehicles for absorbing shock and vibration and preventing injury to the vehicle springs incident to a rebound of the vehicle body when a wheel passes over an obstruction or drops into a rut or depression.

The invention consists essentially of two members which have connection with the parts of a vehicle in such a manner as to retard the action of the vehicle springs when subjected to a rebound, one of such members having an inclined face and the other member comprising a yieldable element exerting a pressure upon the inclined faces to retard the movement of the first mentioned member.

The invention consists of the novel features, details of construction and combination of parts, which hereinafter will be more particularly set forth, illustrated and claimed.

In the drawings hereto attached:—Figure 1 is a front view of a shock absorber embodying the invention. Fig. 2 is a view similar to Fig. 1 having the cover of the casing omitted and showing one of the members moved so as to press apart the yieldable elements. Fig. 3 is a section on the line x—x of Fig. 1. Fig. 4 is a section on the line y—y of Fig. 1.

Corresponding and like parts are referred to in the following description, and indicated in all the views of the drawings, by the same reference characters.

The shock absorber comprises two members 1 and 2 which are adapted to be arranged so as to retard the rebound of the vehicle spring when the wheel drops into a rut or depression or passes over an obstruction. The members 1 and 2 may be attached to the body and axle respectively of a vehicle or may be fastened to the upper and lower parts of a vehicle spring according to the specific application of the device. The member 1 consists of a blade since it is long, comparatively thin and wide. This blade has tapered portions 3 and 4 and an intermediate contracted portion 5. The tapered portion 3 is of greater width than the tapered portion 4 and its inclined edges or faces are adapted to sustain the pressure of the laterally yielding elements when retarding the rebound of the vehicle spring. The part 4 being narrower than the part 3 offers slight resistance in conjunction with the laterally yieldable elements when the vehicle spring is compressed.

The member 2 consists of a casing and its opposite ends constitute barrels in which are located expansible, helical springs 6 and balls 7. The balls 7 are located at the inner ends of the barrels and are pressed against the inclined edges or faces of the member 1. Cups 8 are interposed between the balls 7 and springs 6 and small balls 9 are placed in the cups 8 and sustain the thrust between the springs 6 and balls 7, thereby serving to reduce the frictional contact between the balls 7 and cups 8 to the smallest amount possible. The member 2 preferably consists of complemental parts which are separable to admit of placing the elements 1, 6, 7, 8 and 9 in position. The meeting faces of the parts comprising the member 2 are cut away as indicated at 10 to receive the member 1. Opposed lugs 11 are formed near the ends of the parts comprising the member 2 and have openings to receive the clips or other fastenings by means of which the member 2 is fastened to the part to which it is to be attached. Rollers 12 are fitted in recesses formed in the members and are located upon opposite sides of the member 1 and relieve the friction between the members 1 and 2.

When the shock absorber is properly positioned upon a vehicle the members 1 and 2 are so arranged that under normal conditions the contracted part 5 of the member 1 is in line with the elements 7. When the vehicle springs are compressed the tapered portion 4 is pressed between the balls 7 which are moved laterally against the tension of the springs 6 and upon a rebound which would tend to expand the vehicle springs the tapered part 3 of the member 1 is caused to pass between the elements 7 and press them apart against the action of the springs 6 and by reason of the comparatively great width of the tapered part 3 the springs 6 offer a great resistance to the outward movement of the element 7 thereby resisting the upward movement of the member 1 and preventing injury to the vehicle springs. The tapered edges or faces of the part 3 result in a gradual action of the device in overcoming the rebound of the vehicle springs.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative and that such changes may be made when desired as are within the scope of the invention as claimed.

Having thus described the invention, what is claimed as new is:—

In combination a member having an inclined face, a ball arranged to ride upon such inclined face, a cup, a plurality of balls interposed between the cup and first mentioned ball and a spring arranged to exert a pressure against the said cup.

In testimony whereof I affix my signature in presence of two witnesses.

HARRY F. HARVEY.

Witnesses:
JOHN H. CALDWELL,
JNO. D. HARVEY.